US009484667B2

(12) United States Patent
Ichio

(10) Patent No.: US 9,484,667 B2
(45) Date of Patent: Nov. 1, 2016

(54) VEHICLE-SIDE CONNECTOR

(71) Applicant: Sumitomo Wiring Systems, Ltd., Yokkaichi, Mie (JP)

(72) Inventor: Toshifumi Ichio, Mie (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 0 days.

(21) Appl. No.: 14/777,529

(22) PCT Filed: Mar. 19, 2013

(86) PCT No.: PCT/JP2013/057883
§ 371 (c)(1),
(2) Date: Sep. 16, 2015

(87) PCT Pub. No.: WO2014/147760
PCT Pub. Date: Sep. 25, 2014

(65) Prior Publication Data
US 2016/0072224 A1    Mar. 10, 2016

(51) Int. Cl.
*H01R 13/629*    (2006.01)
*B60L 11/18*    (2006.01)
(Continued)

(52) U.S. Cl.
CPC ......... *H01R 13/629* (2013.01); *B60L 11/1818* (2013.01); *H01R 13/4367* (2013.01);
(Continued)

(58) Field of Classification Search
CPC ............ H01R 13/629; H01R 13/4367; H01R 13/506; H01R 13/6683; B60L 11/1818; B60L 2270/34; B60L 2270/36
USPC ....... 439/345, 752, 460, 638, 464, 470, 449, 439/452
See application file for complete search history.

(56) References Cited

U.S. PATENT DOCUMENTS 5,700,156 A * 12/1997 Bussard ............. H01R 13/5804
439/471
5,751,135 A *  5/1998 Fukushima ......... B60L 11/1818
320/107
(Continued)

FOREIGN PATENT DOCUMENTS

JP    2011-249039    12/2011
JP    2012-243467    12/2012
WO    2011/097007    8/2011

OTHER PUBLICATIONS

International Search Report.
(Continued)

*Primary Examiner* — Chandrika Prasad
*Assistant Examiner* — Harshad Patel
(74) *Attorney, Agent, or Firm* — Gerald E. Hespos; Michael J. Porco; Matthew T. Hespos

(57) ABSTRACT

A vehicle-side connector (10) to be connected to a battery mounted in a vehicle includes an outer housing (31) to be fixed to a body of the vehicle, an inner housing (50) to be fitted into the outer housing (31) from a vehicle interior side, terminal fittings (11) respectively connected to a plurality of wires (20P, 20S) drawn out from the interior of the vehicle including the battery, a plurality of terminal accommodating chambers (53, 40) provided from the inner housing (50) to the outer housing (31) and configured such that the respective terminal fittings (11) are inserted and accommodated thereinto from behind, a retainer (60) assemblable with the inner housing (50) to lock and retain each terminal fitting (11), and a lock mechanism portion (47, 70) configured to lock the retainer (60) and the outer housing (31) in a joined state.

1 Claim, 16 Drawing Sheets

(51) Int. Cl.
*H01R 13/436* (2006.01)
*H01R 13/506* (2006.01)
*H01R 24/86* (2011.01)
*H01R 13/66* (2006.01)
*H01R 13/74* (2006.01)

(52) U.S. Cl.
CPC ............ *H01R13/506* (2013.01); *H01R 24/86* (2013.01); *B60L 2240/36* (2013.01); *B60L 2270/32* (2013.01); *B60L 2270/34* (2013.01); *H01R 13/6683* (2013.01); *H01R 13/748* (2013.01); *Y02T 10/7005* (2013.01); *Y02T 10/7072* (2013.01); *Y02T 90/14* (2013.01)

(56) References Cited

U.S. PATENT DOCUMENTS

| | | | | |
|---|---|---|---|---|
| 6,443,766 | B2* | 9/2002 | Ichio | H01R 13/4367 439/274 |
| 8,425,256 | B2* | 4/2013 | Aoki | H01R 13/688 439/620.26 |
| 2002/0173205 | A1* | 11/2002 | Kato | H01R 13/4367 439/752 |
| 2011/0034053 | A1* | 2/2011 | Matsumoto | B60L 3/0069 439/304 |
| 2011/0204849 | A1 | 8/2011 | Mukai et al. | |
| 2011/0287667 | A1* | 11/2011 | Ichio | H01R 13/4367 439/660 |
| 2012/0062385 | A1 | 3/2012 | Wiesemann et al. | |
| 2012/0295460 | A1* | 11/2012 | Ichio | H01R 13/5208 439/205 |
| 2015/0031235 | A1 | 1/2015 | Wiesemann et al. | |

OTHER PUBLICATIONS

European Search Report Dated November 30, 2015.

\* cited by examiner

VEHICLE-SIDE CONNECTOR

BACKGROUND

1. Field of the Invention

The present invention relates to a vehicle-side connector to be connected to a battery mounted in a vehicle.

2. Description of the Related Art

An example of a vehicle-side connector of this type is known from Japanese Unexamined Patent Publication No. 2011-249039. This vehicle-side connector is structured such that a plurality of terminal accommodating chambers are formed in alignment in a housing which is mounted to face a power supply port open on a body and terminal fittings connected to ends of wires drawn out from a battery device side are inserted into the corresponding terminal accommodating chambers from behind and retained by mounting a retainer on the rear surface of the housing. By connecting a charging connector connected to a power supply to the vehicle-side connector, the battery is charged.

Here, in mounting the vehicle-side connector on the body, the vehicle-side connector is assembled by mounting the retainer on the rear surface of the housing after the corresponding terminal fitting provided on the end of the wire is inserted into each terminal accommodating chamber of the housing. Thereafter, this vehicle-side connector is fixed to the body by bolting or the like.

However, in assembling the above conventional vehicle-side connector, the terminal fittings provided on the ends of the respective wires need to be inserted into the corresponding terminal accommodating chambers arranged together in a narrow area of the suitably large housing while the positions of the terminal accommodating chambers, into which the wires are supposed to be inserted, are searched and confirmed. Thus, an assembling operation itself is cumbersome and the suitably large vehicle-side connector needs to be handled while being provided on an end of a wire group until the assembled vehicle-side connector is mounted on the body. The handling of the vehicle-side connector is difficult and an operation of assembling the vehicle-side connector and mounting it on the body generally tends to be cumbersome. Thus, a further improvement has been desired.

The present invention was completed based on the above situation and aims to enable an operation of assembling a vehicle-side connector and mounting it on a body to be quickly performed.

SUMMARY

The present invention is directed to a vehicle-side connector to be connected to a battery mounted in a vehicle, including an outer housing to be fixed to a body of the vehicle, an inner housing to be fitted into the outer housing from a vehicle interior side, terminal fittings respectively connected to a plurality of wires drawn out from the interior of the vehicle including the battery, a plurality of terminal accommodating chambers provided from the inner housing to the outer housing and configured such that the respective terminal fittings are inserted and accommodated thereinto from behind, a retainer assemblable with the inner housing to lock and retain each terminal fitting, and a lock mechanism portion configured to lock the retainer and the outer housing in a joined state.

An example of an operation procedure of assembling the vehicle-side connector and mounting it on the body is as follows. A sub-assembly is formed on an end of a wire group by assembling the retainer to retain the terminal fittings while accommodating the terminal fittings into the respective terminal accommodating chambers of the inner housing. On the other hand, the outer housing is mounted on the body in advance, the inner housing is fitted into the outer housing and the retainer is locked to the outer housing while the terminal fittings on the side of the sub-assembly are inserted into the terminal accommodating chambers of the outer housing. In this way, the assembling of the vehicle-side connector and the mounting thereof on the body are concurrently performed.

Since an inserting operation of the individual terminal fittings is performed only by inserting them into the terminal accommodating chambers of the relatively small inner housing, the terminal accommodating chambers, into which the terminal fittings are supposed to be inserted, are easily distinguishable and the terminal fittings can be precisely and easily inserted. Further, since the small-size sub-assembly provided on the end of the wire group can be handled, an operation of assembling the vehicle-side connector and mounting it on the body can be easily and quickly performed in total.

The following configurations may also be adopted.

(1) The inner housing includes a sensor accommodating chamber configured to accommodate a temperature sensor provided on an end of a wire drawn out from the interior of the vehicle, and the retainer includes a sensor locking portion configured to lock and retain the temperature sensor. The temperature sensor can be retained using the retainer for the terminal fittings in accommodating the temperature sensor into the sensor accommodating chamber.

(2) The temperature sensor is formed into a column shape having a larger diameter than the wire, whereas the sensor locking portion is a hole formed by connecting a large-diameter hole having a larger diameter than the temperature sensor and a small-diameter hole having a smaller diameter than the temperature sensor and enabling the wire to be inserted therethrough.

The temperature sensor is retained by radially moving the temperature sensor and locking the rear surface thereof to an opening edge part on the back surface of the small-diameter hole while the wire is inserted into the small-diameter hole after the temperature sensor is inserted through the large-diameter hole in the hole. The temperature sensor can be accommodated in a retained state even after the mounting of the retainer.

According to the present invention, it is possible to enable an operation of assembling a vehicle-side connector and mounting it on a body to be quickly performed.

DETAILED DESCRIPTION

One embodiment of the present invention is described with reference to FIGS. 1 to 19. In this embodiment, a vehicle-side connector 10 to be connected to a mating charging connector 1 to charge a battery mounted in a plug-in hybrid vehicle is illustrated.

Figure 19:
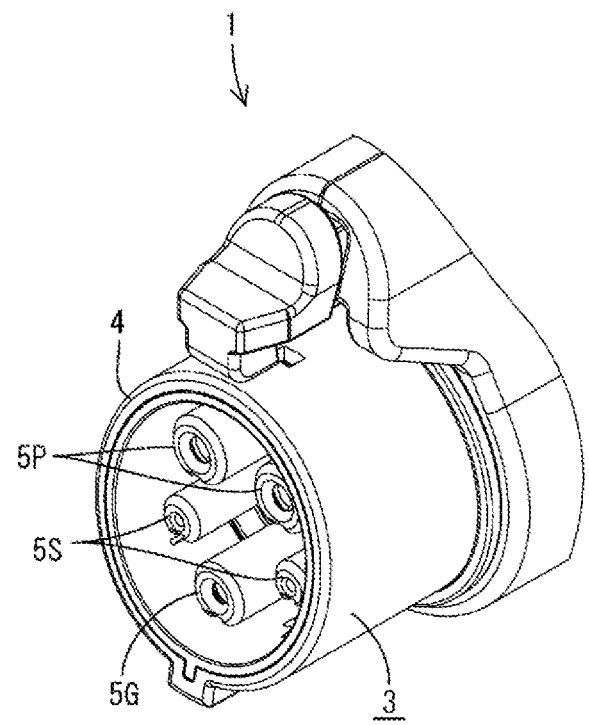
FIG. 19 is a partial perspective view of a mating charging connector.

First, the mating charging connector 1 is briefly described. As shown in FIG. 19, the charging connector 1 includes a female housing 3 to be connected to the vehicle-side connector 10. This female housing 3 is structured such that five terminal accommodating tubes 5 independent of each other project from a back wall in a small receptacle 4. Female power terminals are accommodated in two terminal accommodating tubes 5P in an upper row, a female ground terminal is accommodated in the terminal accommodating tube 5G in the center of a lower row and female signal terminals are accommodated in the terminal accommodating tubes 5S on opposite ends of the lower row.

Figure 1:
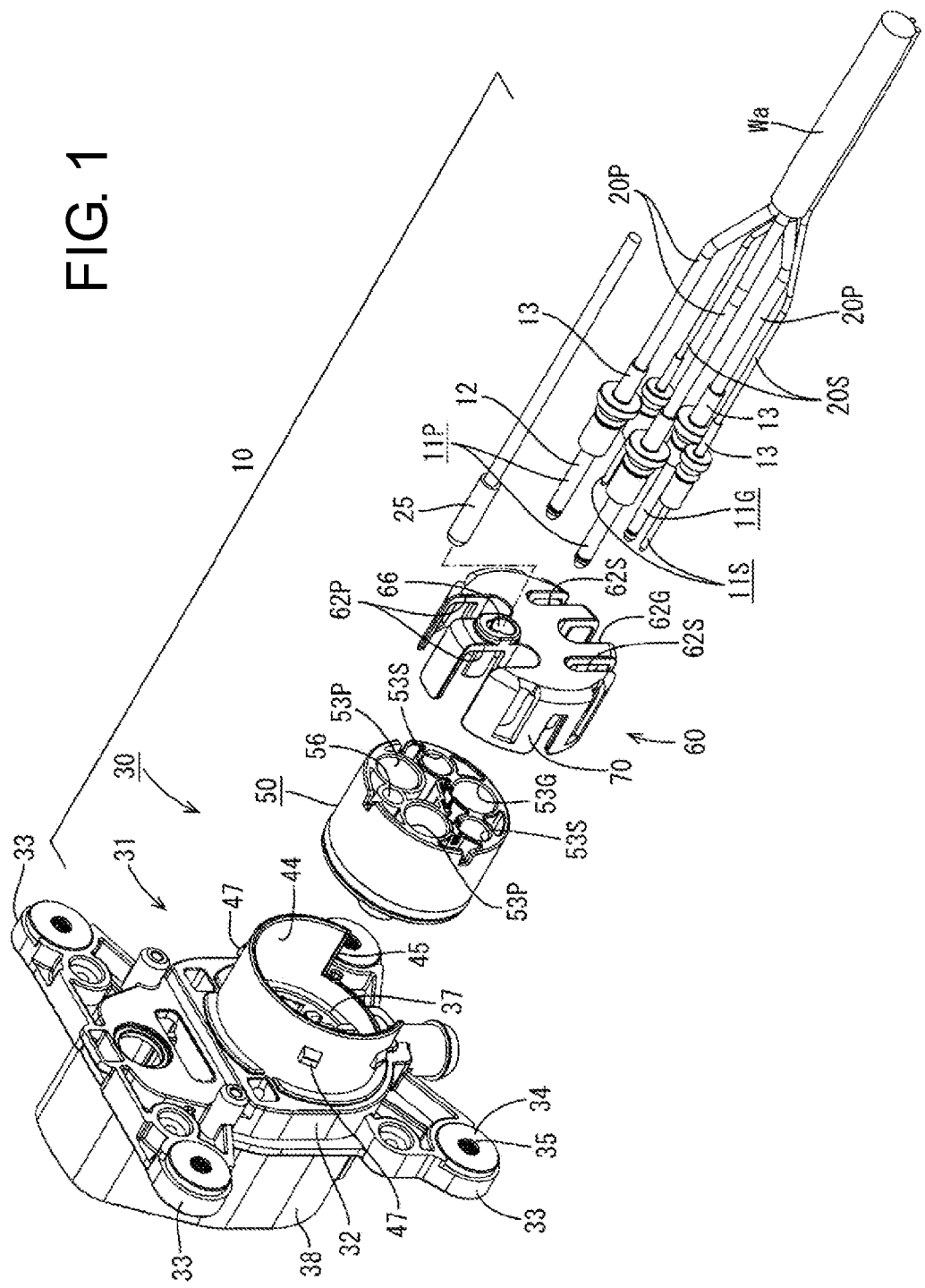
FIG. 1 is an exploded perspective view of a vehicle-side connector according to one embodiment of the present invention.

As shown in FIG. 1, the vehicle-side connector 10 includes five vehicle-side terminals 11, a temperature sensor 25, a female housing 30 for accommodating these vehicle-side terminals 11 and temperature sensor 25 and a retainer 60 for retaining the vehicle-side terminals 11 and the temperature sensor 25.

The vehicle-side terminals 11 are composed of two male power terminals 11P, one male ground terminal 11G and two male signal terminals 11S. In the following description, the five vehicle-side terminals are referred to as "vehicle-side terminals 11" when being commonly described while being distinguished as the power terminals 11P, the ground terminal 11G and the signal terminals 11S when being individually described. Each vehicle-side terminal 11 is basically formed of a straight round pin terminal.

Figure 11:
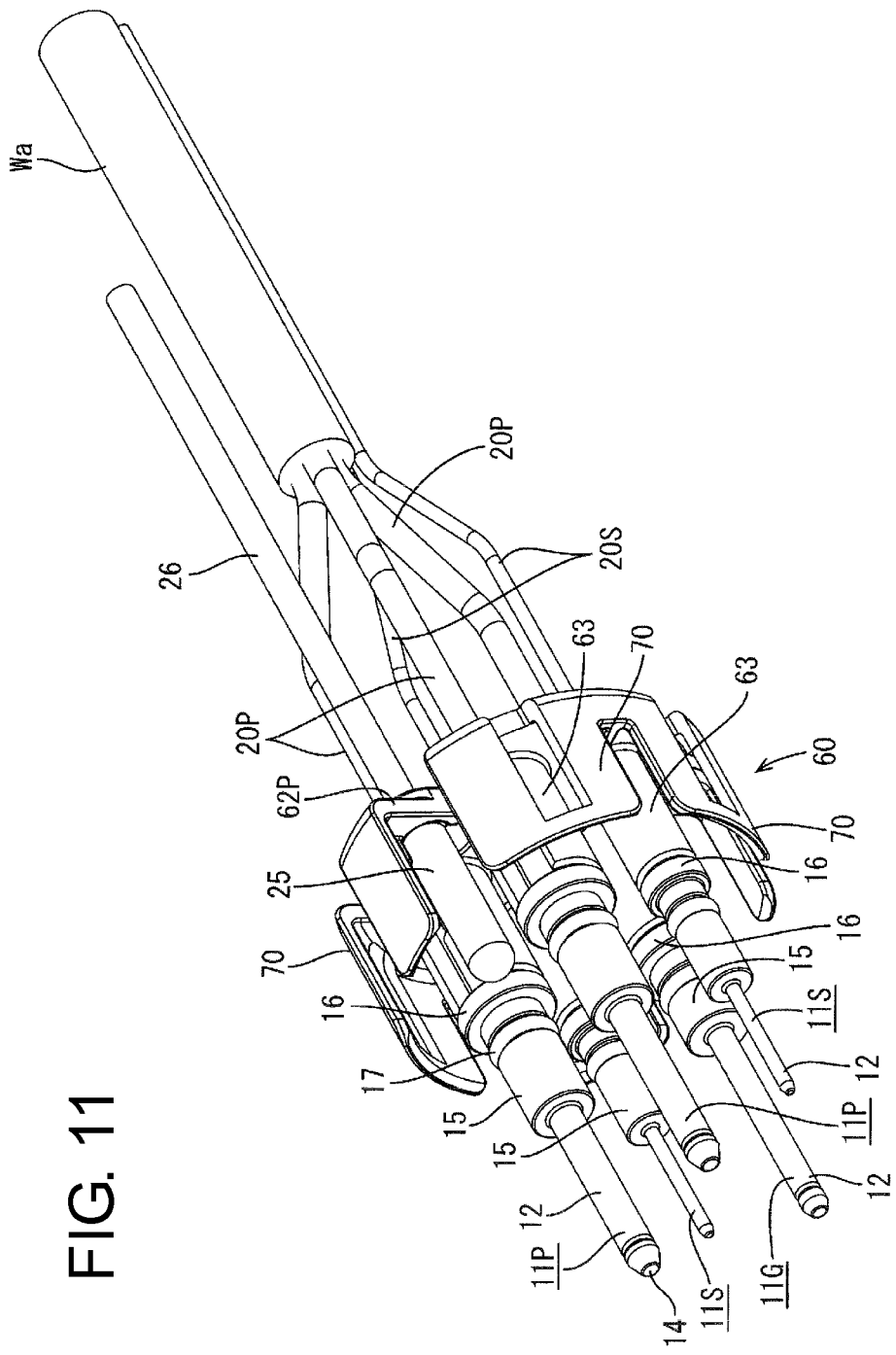
FIG. 11 is a perspective view showing a state where vehicle-side terminals and a temperature sensor are assembled with a retainer.

As show in FIGS. 1 and 11, the power terminal 11P is formed with a terminal connecting portion 12 to be connected to the mating power terminal on a tip side and a tubular wire connecting portion 13 to be crimped to a core of a wire 20 on a rear end side. A protection cap 14 is fitted on the tip surface of the terminal connecting portion 12, and a fitting portion 15 and a flange 16 enlarged in diameter are formed on a base end side of the terminal connecting portion 12. A seal ring 17 is fitted on the outer periphery of a base end side of the fitting portion 15. The power terminal 11P is connected to an end of a large-diameter wire 20P (thick wire 20P).

The ground terminal 11G and the signal terminal 11S are described. Note that parts of the both terminals 11G, 11S having the same function as the power terminal 11P described above are denoted by the same reference signs and repeated description is simplified or omitted.

The ground terminal 11G is shaped similarly to the power terminal 11P except that a terminal connecting portion 12 is slightly thinner than that of the power terminal 11P and the front surface of a fitting portion 15 is located more backward than that of the power terminal 11P, and is connected to an end of a thick wire 20P by likewise crimping a wire connecting portion 13.

Note that three thick wires 20P are bundled into one as an integrated shielded wire Wa (cab tire cable).

The signal terminal 11S differs from the power terminal 11P in that it is thinner in diameter as a whole, a terminal connecting portion 12 is short and no protection cap is mounted. An end of a small-diameter wire 20S (thin wire 20S) is connected to this signal terminal 11S by crimping a wire connecting portion 13.

Further, the temperature sensor is formed into a cylindrical shape as a whole and a lead wire 26 having a smaller diameter than the temperature sensor 25 is drawn out from the rear surface of the temperature sensor 25.

Figure 2:
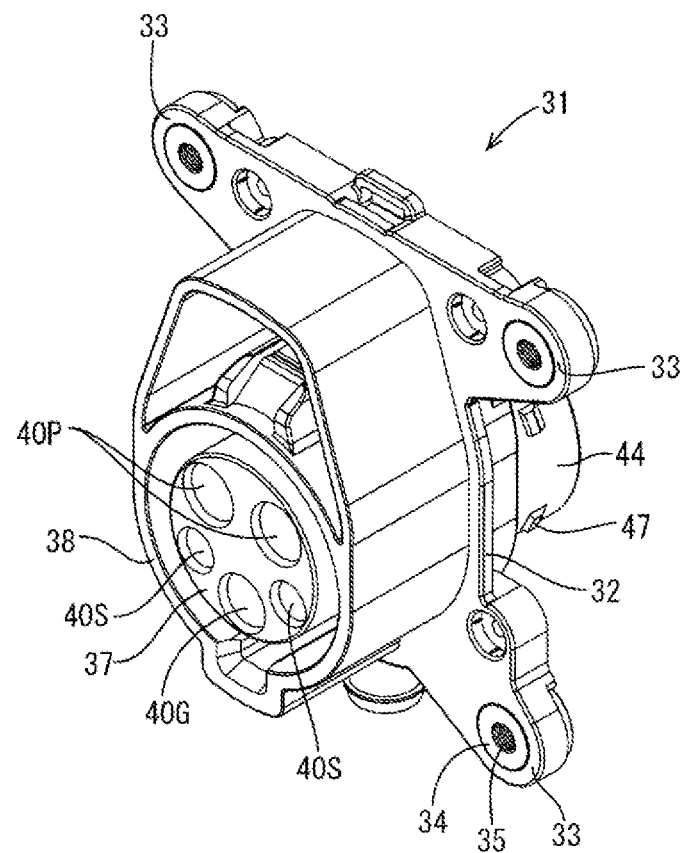
FIG. 2 is a perspective view viewed from front showing an outer housing.
Figure 3:
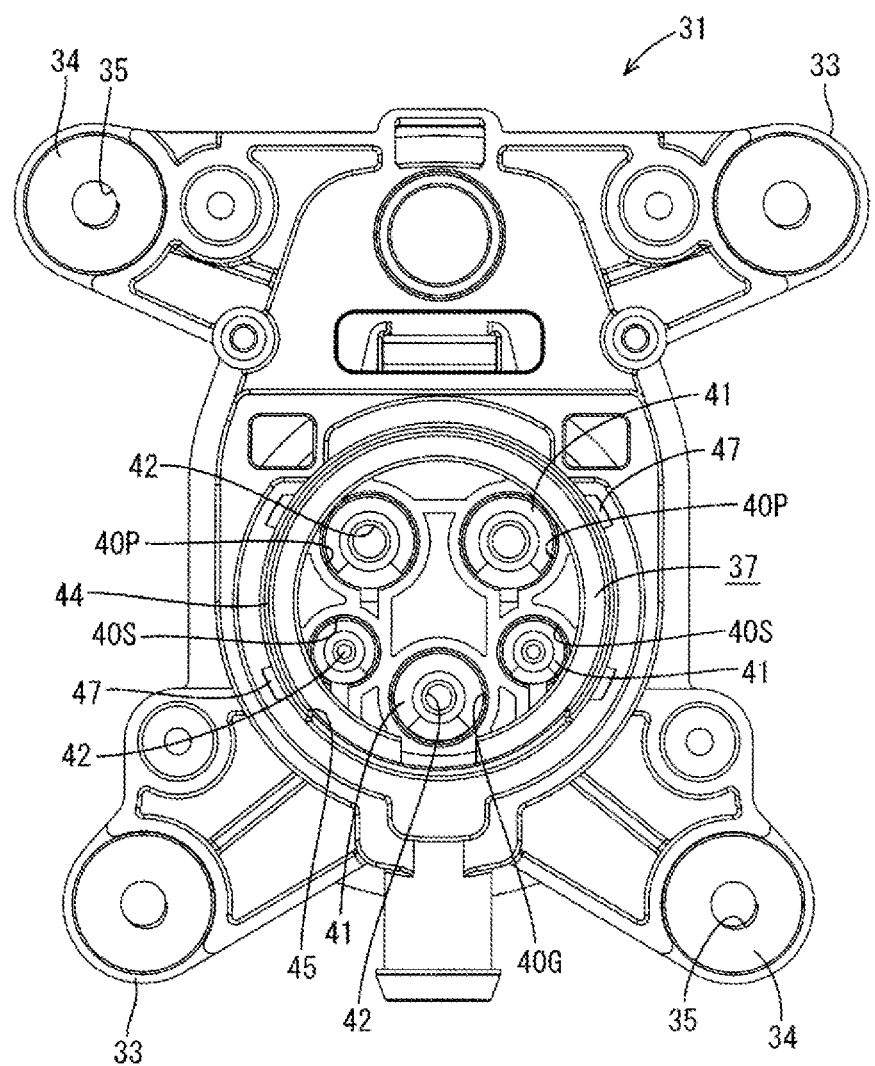
FIG. 3 is a rear view of the outer housing.
Figure 4:
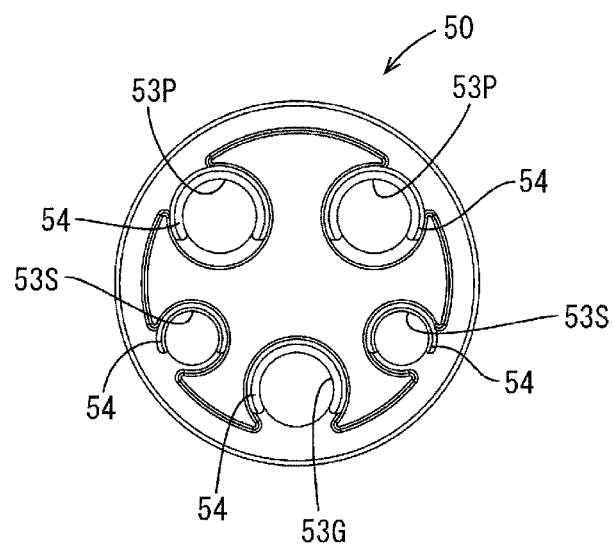
FIG. 4 is a front view of an inner housing.

The male housing 30 is made of synthetic resin and composed of two pieces, i.e. an outer housing 31 and an inner housing 50 as shown in FIG. 1. As shown in FIGS. 2 and 3, the outer housing 31 is such that mounting portions 33 are formed to project outward on four corners of a substantially rectangular base plate 32 and a collar 34 made of metal and formed with a bolt hole 35 is provided in each mounting portion 33 by insert molding.

A cylindrical terminal accommodating portion 37 is formed to project on the front surface of the base plate 32, and a large receptacle 38 into which the small receptacle 4 of the female housing 3 in the charging connector 1 described above is to be fitted is formed around the terminal accommodating portion 37.

The terminal accommodating portion 37 is formed with five front terminal accommodating chambers 40 open forward and backward in such an arrangement that the terminal accommodating tubes 5 of the mating charging connector 1 are fittable with the front surfaces in the lead.

Two front terminal accommodating chambers 40P in an upper row are for the male power terminals 11P, the front terminal accommodating chamber 40G in the center of the lower row is for the male ground terminal 11G and the front terminal accommodating chambers 40S on opposite ends of the lower row are for the male signal terminals 11S.

Figure 13:
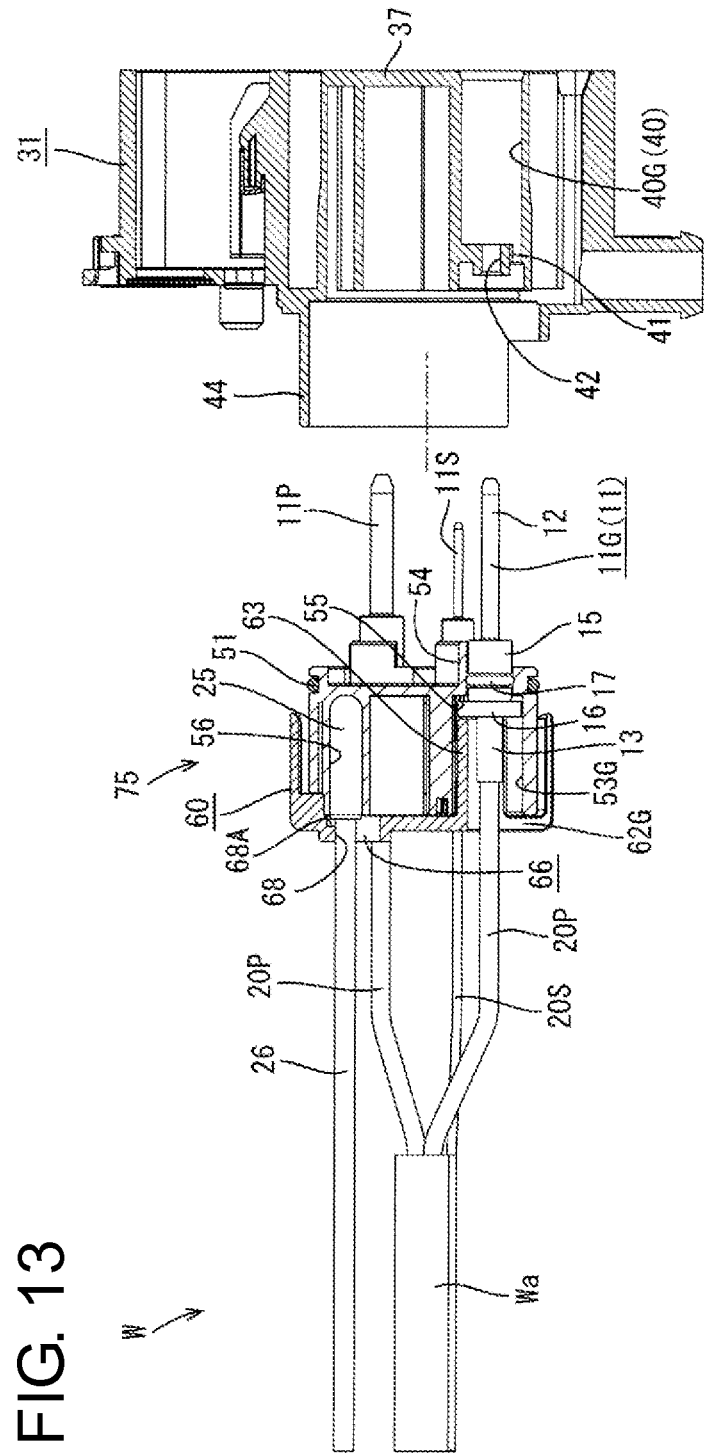
FIG. 13 is a section showing an operation of assembling the sub-assembly with the outer housing.

As shown in FIG. 13, a stopper wall 41 with which the front surface of the fitting portion 15 of the corresponding vehicle-side terminal 11 is brought into contact is formed at a position of each front terminal accommodating chamber 40 near the rear end and an insertion hole 42 allowing the terminal connecting portion 12 of the corresponding vehicle-side terminal 11 to be inserted therethrough is open on each stopper wall 41.

A fitting tube portion 44 is formed around the rear surface of the terminal accommodating portion 37 on a rear surface side of the base plate 32, and a rear end side of the lower surface of this fitting tube portion 44 is cut to form a recess 45 in a substantially quarter circular area. The inner housing 50 is fittable into the fitting tube portion 44.

Figure 14:
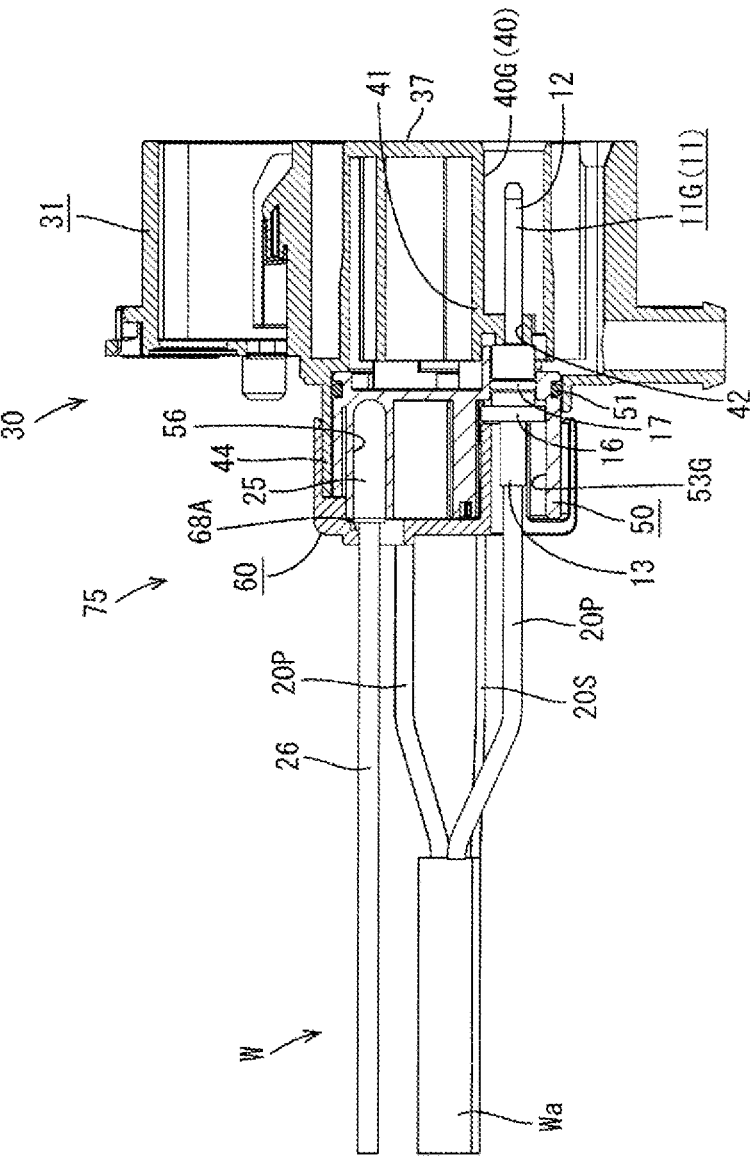
FIG. 14 is a section when the assembling is completed.
Figure 15:
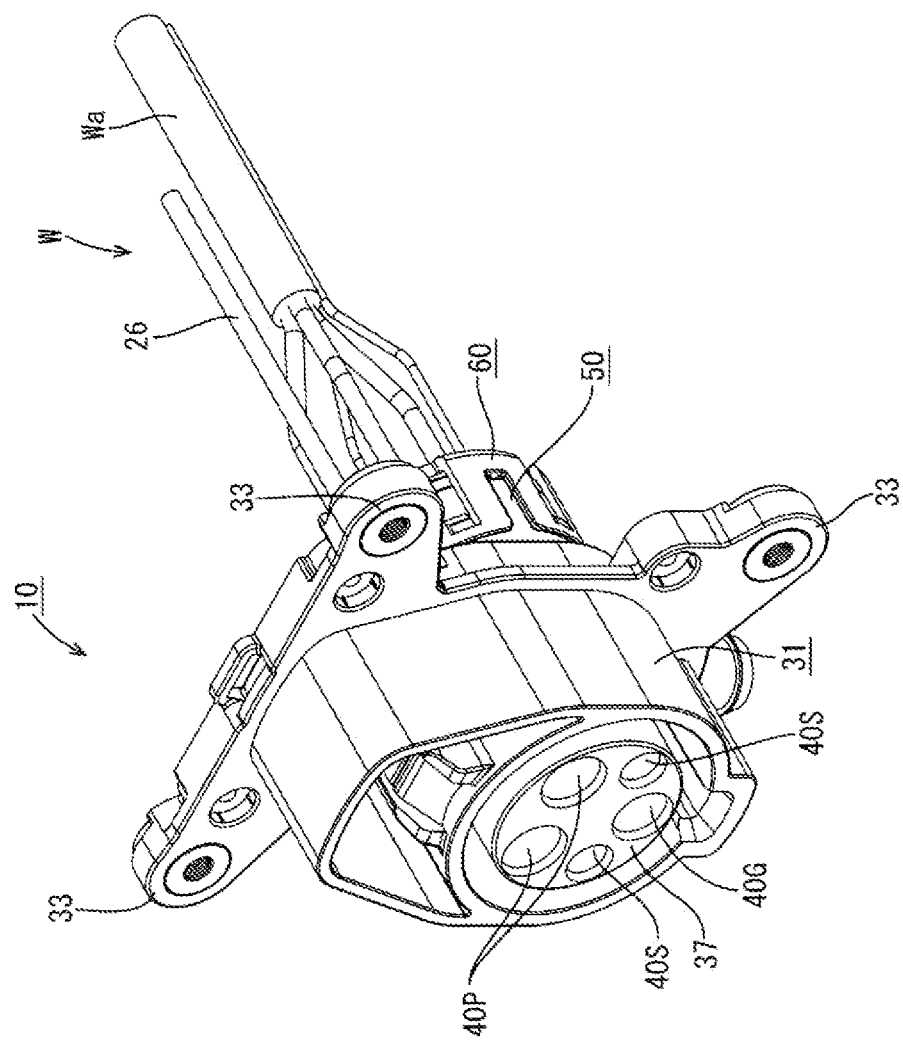
FIG. 15 is a perspective view viewed from front when the assembling is completed.
Figure 16:
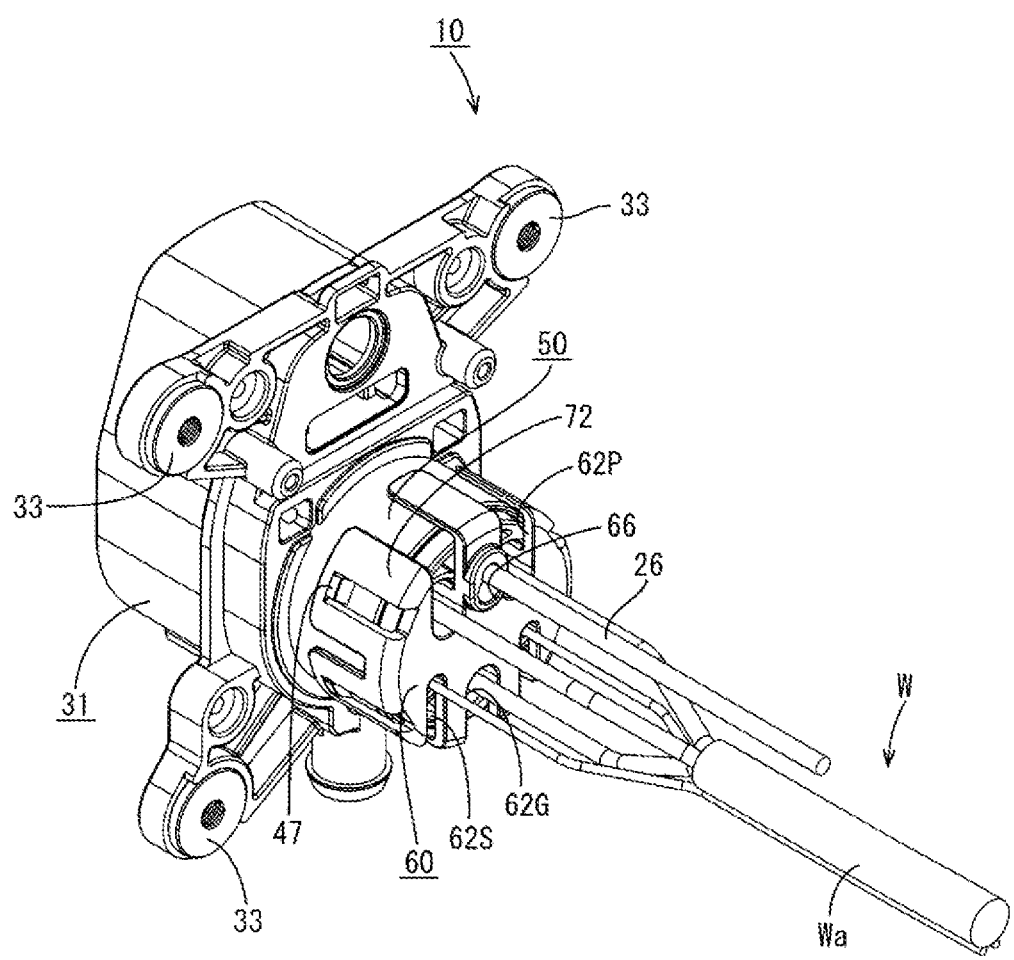
FIG. 16 is a perspective view viewed from behind when the assembling is completed.
Figure 17:
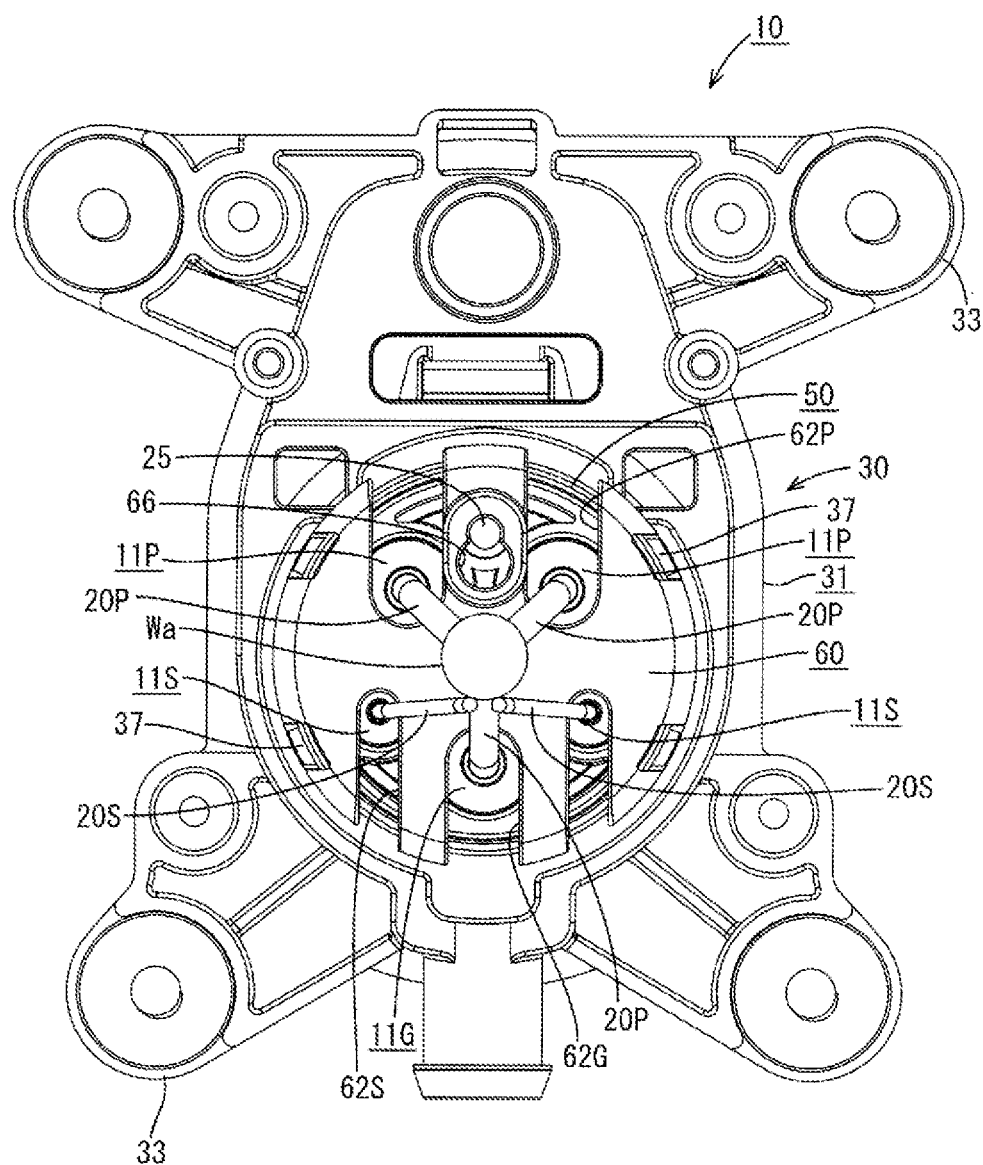
FIG. 17 is a rear view when the assembling is completed.
Figure 18:
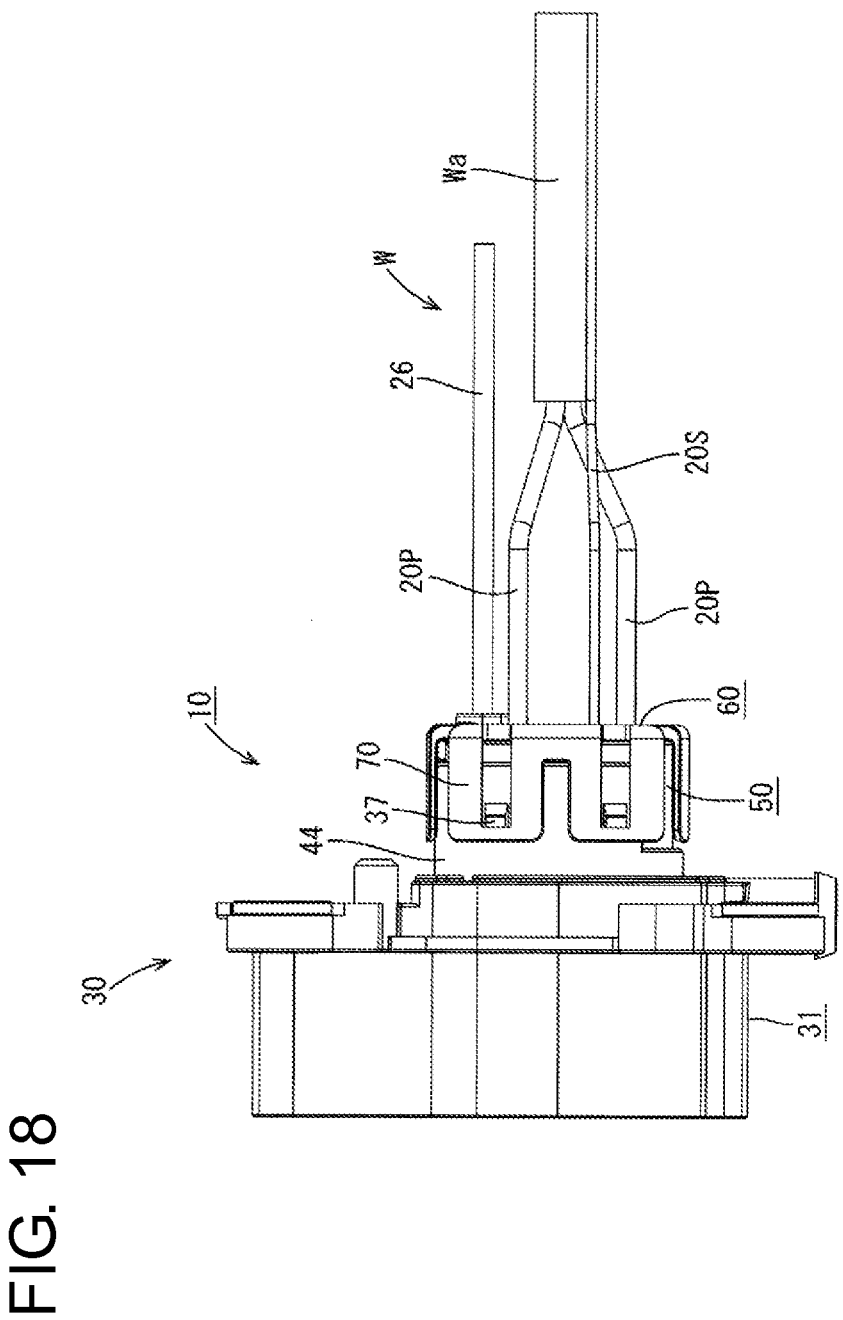
FIG. 18 is a side view when the assembling is completed.

The inner housing 50 is formed into a short cylindrical shape having such radial and length dimensions as to be substantially completely fitted into the fitting tube portion 44 and a seal ring 51 is fitted on the outer peripheral surface of the inner housing 50 near the front end and can be held in close contact with the inner peripheral surface of the fitting tube portion 44 near the back end as shown in FIG. 14.

In the inner housing 50, five terminal accommodating chambers 53 open forward and backward are formed to be concentrically connected to the corresponding front terminal accommodating chambers 40 provided in the terminal accommodating portion 37 described above.

The corresponding vehicle-side terminal 11 (power terminal 11P, ground terminal 11G, signal terminal 11S) is insertable into each rear terminal accommodating chamber 53P, 53G, 53S from behind and has such a diameter that the flange 16 of each vehicle-side terminal 11 is fittable. A connecting tube portion 54 reduced in diameter to be tightly fitted to the fitting portion 15 of the corresponding vehicle-side terminal 11 is connected to the front edge of each front terminal accommodating chamber 40 and projects from the front surface of the inner housing 50, the seal ring 17 fitted on the fitting portion 15 can be held in close contact with the inner peripheral surface of a rear end side of this connecting tube portion 54, and a front end side of the connecting tube portion 54 is fittable to a rear end part of the front terminal accommodating chamber 40. Note that a lower surface side of a peripheral wall is cut over a predetermined angle range in a front end part of the connecting tube portion 54.

Figure 5:
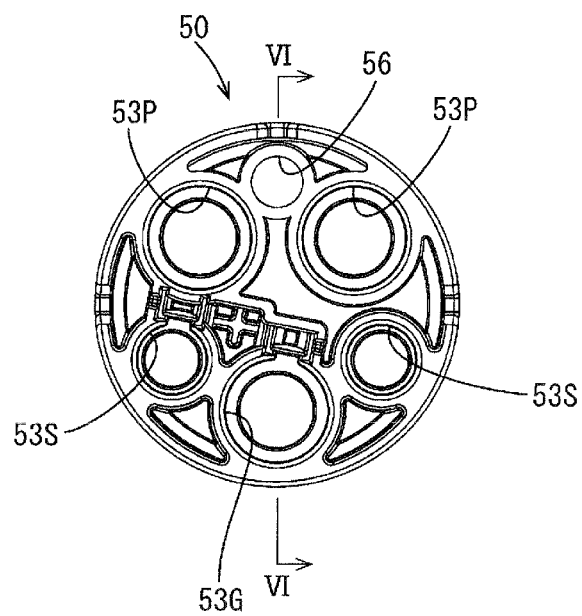
FIG. 5 is a rear view of the inner housing.
Figure 6:
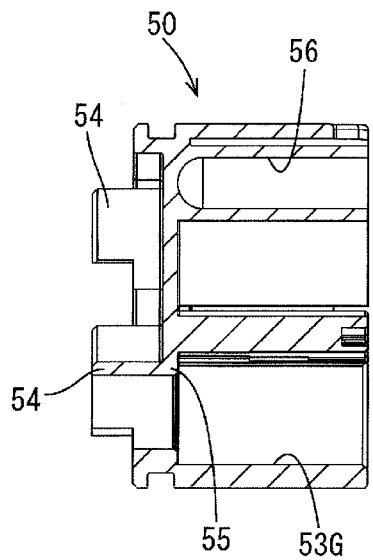
FIG. 6 is a section along VI-VI of FIG. 5.
Figure 7:
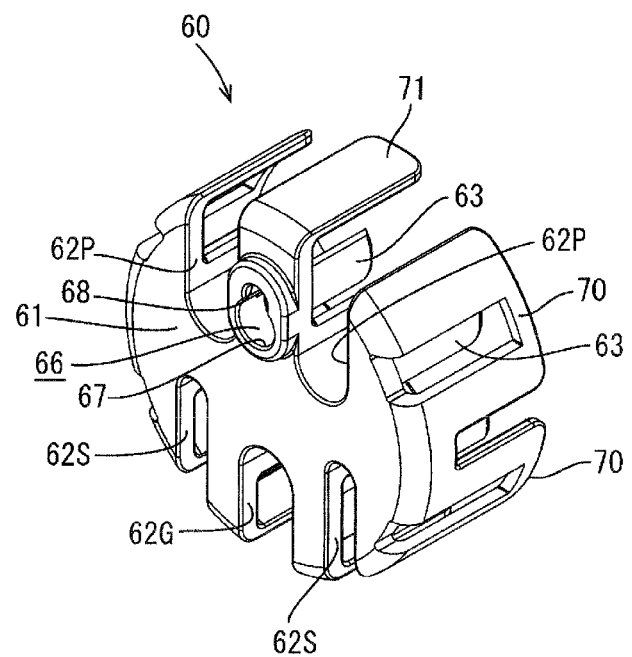
FIG. 7 is a perspective view of a retainer.

Further, as shown in FIGS. 5 and 13, a sensor accommodating chamber 56 into which the temperature sensor 25 is substantially tightly insertable is formed at a position between the two rear terminal accommodating chambers 53P in the upper row on the rear surface of the inner housing 50 while being closed on the back end.

The retainer 60 is provided to hold the corresponding vehicle-side terminal 11 in a state retained from each front terminal accommodating chamber 40 to the rear terminal accommodating chamber 53. This retainer 60 also functions to retain the temperature sensor 25 inserted into the sensor accommodating chamber 56.

The retainer 60 is made of synthetic resin and includes, as shown in FIGS. 7 to 10, a disc-like main body plate 61 to be brought into contact with the rear surface of the inner housing 50 described above.

Five vertical grooves 62 into which the wires 20P, 20S drawn out backward from the vehicle-side terminals 11 are radially insertable are formed on the main body plate 61 by cutting to be open on the peripheral edge. An edge part of the back end of each vertical groove 62 is formed into a semi-circular shape and the back end is arranged concentrically with the corresponding one of the five rear terminal accommodating chambers 53.

Figure 8:
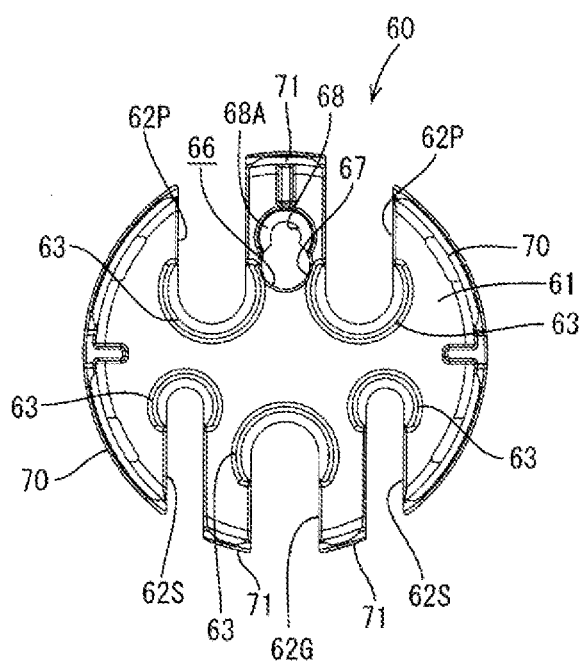
FIG. 8 is a front view of the retainer.
Figure 9:
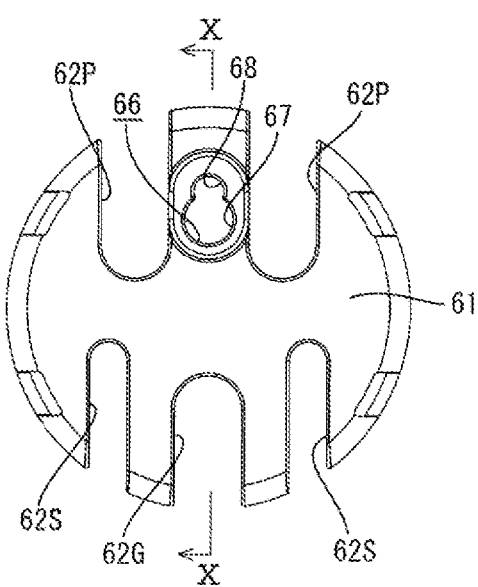
FIG. 9 is a rear view of the retainer.
Figure 10:
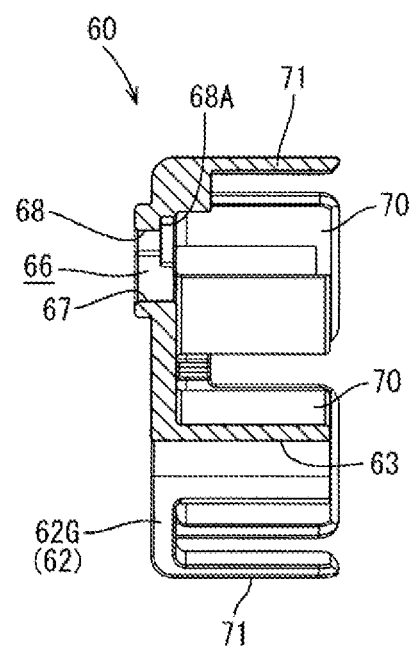
FIG. 10 is a section along X-X of FIG. 9.

The thick wires 20P connected to the power terminals 11P are radially inserted into two vertical grooves 62P open on the upper edge out of the five vertical grooves 62, and a groove width of these vertical grooves 62 is slightly smaller than a diameter of the flanges 16 formed on the power terminals 11P. As shown in FIG. 8, locking groove bodies 63 having a substantially semi-circular cross-section and having an opening on the upper surface are formed to project on peripheral edges on front surface sides of the back ends of these vertical grooves 62 and the tip edges of the locking groove bodies 63 function to prevent the power terminals 11P from coming out backward by being locked to the flanges 16 of the power terminals 11P.

The thick wire 20P connected to the ground terminal 11G is radially insertable into the center vertical groove 62G out of the three vertical grooves 62 open on the lower edge, and a groove width of this vertical groove 62 is slightly smaller than a diameter of the flange 16 formed on the ground terminal 11G. A locking groove body 63 having a substantially semi-circular cross-section and having an opening on the lower surface is formed to project on a peripheral edge on a front surface side of the back end of this vertical groove 62 and the flange 16 of the ground terminal 11G can be locked to the tip edge of this locking groove body 63.

The thin wires 20S connected to the signal terminals 11S are radially insertable into the two vertical grooves 62S on the opposite ends and a groove width of these vertical grooves 62 is slightly smaller than a diameter of the flanges 16 formed on the signal terminals 11S. Locking groove bodies 63 having a substantially semi-circular cross-section and having an opening on the lower surface are formed to project on peripheral edges on front surface sides of the back ends of these vertical grooves 62 and the flanges 16 of the signal terminals 11S can be locked to the tip edges of the locking groove bodies 63.

A snowman-shaped hole 66 functioning as a locking portion for the temperature sensor 25 is formed at a position between the two vertical grooves 62P open on the upper edge in the main body plate 61 of the retainer 60. This snowman-shaped hole 66 is formed by connecting a small-diameter hole 68 having a smaller diameter than the temperature sensor 25 and enabling the lead wire 26 to be inserted therethrough above a large-diameter hole 67 having a larger diameter than the temperature sensor 25. The small-diameter hole 68 of this snowman-shaped hole 66 is arranged concentrically with the sensor accommodating portion 56 formed in the inner housing 50. Note that a formation area of the snowman-shaped hole 66 is formed to be thicker than other areas and protrude from the rear surface, thereby being reinforced.

Two lock frames 70 which can slide in contact with the outer peripheral surface of the fitting tube portion 44 of the outer housing 31 described above are resiliently displaceably formed to project forward on each of left and right sides of the peripheral edge of the main body plate 61 in the retainer 60. Two lock frames 70 are formed while being spaced apart on each of the left and right sides, specifically between the right vertical groove 62P open upward and the vertical groove 62S on the right end open downward and between the left vertical groove 62P open upward and the vertical groove 62P on the left end open downward. Note that three clamping plates 71 capable of clamping the fitting tube portion 44 in cooperation with the outer peripheral surface of the inner housing 50 are formed at a position between the left and right vertical grooves 62P open upward and at positions between the three vertical grooves 62G, 62S open downward on the peripheral edge of the main body plate 61 while likewise projecting forward.

On the other hand, on the outer peripheral surface of the fitting tube portion 44, lock protrusions 47 are formed at a total of four positions corresponding to the respective lock frames 70 as shown in FIG. 3.

Next, an example of the procedure of assembling the vehicle-side connector 10 and mounting it on the body is described.

First, the five vehicle-side terminals 11 (power terminals 11P, ground terminal 11G, signal terminals 11S) connected to the ends of the wires 20P, 20S are mounted into the retainer 60. To do so, the wires 20P, 20S drawn out from the vehicle-side terminals 11 are respectively radially inserted into the corresponding vertical grooves 62P, 62G, and 62S in the retainer 60. When the wires 20P, 20S are inserted to the back ends, the wire connecting portions 13 and the ends of the wires 20P, 20S are fitted into the locking groove bodies 63. When the respective wires 20P, 20S are subsequently pulled, the flanges 16 of the respective vehicle-side terminals 11 are locked to the tips of the locking groove bodies 63 and the respective vehicle-side terminals 11 are mounted while being prevented from coming out backward as shown in FIG. 11.

On the other hand, the temperature sensor 25 is inserted into the large-diameter hole 67 of the snowman-shaped hole 66 formed on the retainer 60 from behind as indicated by an arrow of FIG. 1. When the temperature sensor 25 reaches the front surface side of the main body plate 61, the lead wire 26 is radially moved toward the small-diameter hole 68. When the lead wire 26 is subsequently pulled backward, the rear surface of the temperature sensor 25 comes into contact with a peripheral edge part 68A on the front surface side of the small-diameter hole 68 of the snowman-shaped hole 66 as likewise shown in FIG. 11, whereby the temperature sensor 25 is prevented from coming out backward.

After the five vehicle-side terminals 11 and the temperature sensor 25 are temporarily assembled with the retainer 60 while being prevented from coming out backward in this way, the retainer 60 is mounted on the rear surface of the inner housing 50.

First, the temperature sensor 25 is pulled forward and inserted into the sensor accommodating portion 56 of the inner housing 50. Subsequently, the terminal connecting portion 12 of each vehicle-side terminal 11 is inserted into the corresponding rear terminal accommodating chamber 53 (53P, 53G, 53S) of the inner housing 50 from behind and, then, the retainer 60 is gradually fitted while defining clearances between the lock frames 70 and the clamping plates 71 and the outer peripheral surface of the inner housing 50.

Associated with that, each vehicle-side terminal 11 moves forward by the flange 16 being pushed by the tip of the locking groove body 63 and projects forwardly of the rear terminal accommodating chamber 53. At this time, the lead wire 26 of the temperature sensor 25 is pulled backward to eliminate looseness.

When the retainer 60 is pushed until the flanges 16 of the vehicle-side terminals 11 come into contact with step portions 55 (connecting portions to the connecting tube portions 54) on the front ends of the corresponding rear terminal accommodating chambers 53 as shown in FIG. 13, the seal rings 17 fitted on the fitting portions 15 of the respective vehicle-side terminals 11 are tightly fitted into base end sides of the corresponding connecting tube portions 54 and the inner housing 50 and the retainer 60 are temporarily sub-assembled on the ends of the respective wires 20P, 20S (vehicle-side terminals 11) by resulting frictional forces. Concurrently, the temperature sensor 25 accommodated in the sensor accommodating portion 56 is retained by locking the rear surface thereof to the peripheral edge part 68A on the front surface of the small-diameter hole 68 in the snowman-shaped hole 66, and the lead wire 26 is pulled backward.

Figure 12:
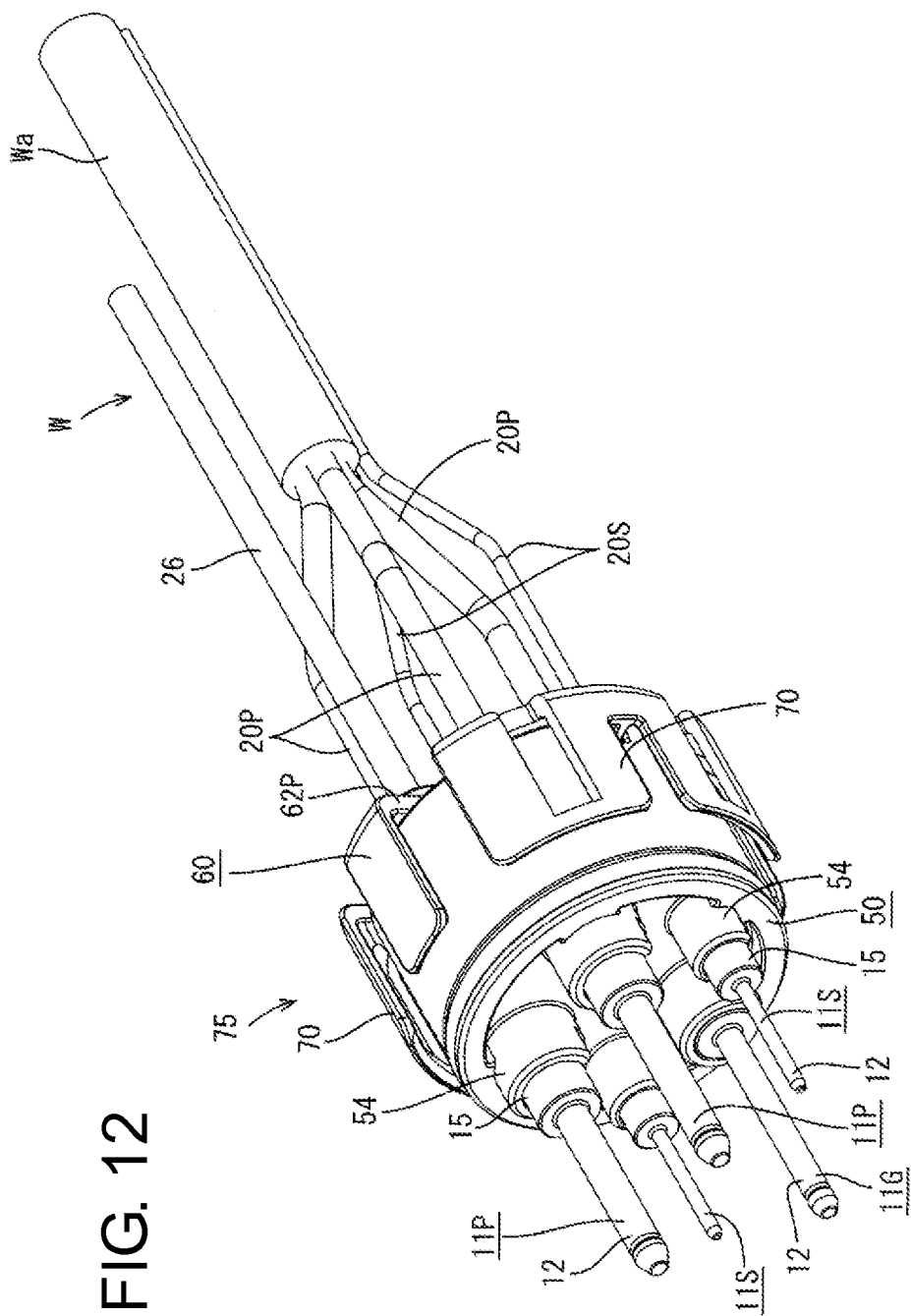
FIG. 12 is a perspective view showing a state where the retainer and the inner housing are assembled into a sub-assembly.

In other words, a sub-assembly in which the inner housing 50 and the retainer 60 are assembled in advance is formed on an end of a wire group W composed of the wires 20P, 20S and the lead wire 26 and, as shown in FIG. 12, the terminal connecting portions 12 of the five vehicle-side terminals 11 are aligned and project forward from the front surface of the sub-assembly 75 and the temperature sensor 25 is accommodated in the sub-assembly 75.

The sub-assembly 75 formed on the end of the wire group W is transported to a site, where the vehicle-side connector 10 is mounted on the body of the vehicle, separately from the outer housing 31.

In mounting, the outer housing 31 is fixed to the body in advance. Specifically, the outer housing 31 is arranged inside the power supply port open on the body to face the power supply port, and the mounting portions 33 provided on the base plate 32 of the outer housing 31 are placed on mounted portions (not shown) provided on an opening edge part of the power supply port and fixed by bolting.

From this state, as shown in FIG. 13, the aforementioned sub-assembly 75 is fitted to the fitting tube portion 44 from behind while the terminal connecting portion 12 of each vehicle-side terminal 11 (11P, 11G, 11S) is inserted into the corresponding front terminal accommodating chamber 40 (40P, 40G, 40S) formed in the terminal accommodating portion 37 of the outer housing 31. The sub-assembly 75 is pushed while the terminal connecting portion 12 of each vehicle-side terminal 11 is inserted into the insertion hole 42 of the stopper wall 41 in the corresponding front terminal accommodating chamber 40 and the lock frames 70 on the outer periphery of the retainer 60 are resiliently displaced to move onto the lock protrusions 47. When the sub-assembly 75 is fitted to a proper position where the front surface of the fitting portion 15 of each vehicle-side terminal 11 comes into contact with the stopper wall 41, the lock frames 70 are restored and displaced to be fitted to the lock protrusions 47, whereby the sub-assembly 75 is locked in a state properly fitted to the fitting tube portion 44. In this way, the sub-assembly 75 is integrally assembled with the outer housing 31 to form the male housing 30 provided with the retainer 60.

Associated with this, the terminal connecting portion 12 of the vehicle-side terminal 11 connected to the end of each wire 20P, 20S is inserted to a proper position into the corresponding front terminal accommodating chamber 40 and accommodated while being prevented from coming out backward by the retainer 60. Concurrently, the temperature sensor 25 is accommodated into the sensor accommodating portion 56 of the inner housing 50 and retained by the retainer 60.

The wires 20P, 20S drawn out from the respective vehicle-side terminals 11 and the lead wire 26 of the temperature sensor 25 are bundled into one wire group W, drawn out backward, arranged and connected to the battery and the like mounted in the vehicle. Note that a grommet (not shown) is mounted from the fitting tube portion 44 of the male housing 30 to a part where the wire group W is drawn out, thereby cutting off water.

On the other hand, a front cover (not shown) is mounted on the front surface of the male housing 30, whereby the mounting of the vehicle-side connector 10 is completed.

In the case of performing a charging operation, the front cover of the male housing 30 is removed and the female housing 3 of the charging connector 1 shown in FIG. 19 is fitted into the terminal accommodating portion 37 of the male housing 30 after a lid body provided on the power supply port is opened, whereby the battery mounted in the vehicle is charged from a commercial power source.

In the vehicle-side connector 10 of this embodiment, the following effects can be obtained.

The sub-assembly 75 is formed on the end of the wire group W by assembling the retainer 60 and retaining the vehicle-side terminals 11 accommodated in the respective rear terminal accommodating chambers 53 of the inner housing 50, whereas the outer housing 31 is fixed to the body in advance and the sub-assembly 75 is fitted to the outer housing 31 and locked while the vehicle-side terminals 11 projecting from the sub-assembly 75 are inserted into the front terminal accommodating chambers 40 of the outer housing 31. In this way, the assembling of the vehicle-side connector 10 and the mounting thereof on the body are concurrently performed.

Since an inserting operation of the individual vehicle-side terminals 11 is performed only by inserting them into the rear terminal accommodating chambers 53 of the relatively small inner housing 50, the rear terminal accommodating chambers 53, into which the vehicle-side terminals 11 are supposed to be inserted, are easily distinguishable and the vehicle-side terminals 11 can be precisely and easily inserted. Further, since the small-size sub-assembly 75 provided on the end of the wire group W can be handled such as while being carried in, an operation of assembling the vehicle-side connector 10 and mounting it on the body can be easily and quickly performed in total.

Since the temperature sensor 25 is retained using the retainer 60 for the vehicle-side terminals 11 in accommodating the temperature sensor 25 into the sensor accommodating portion 56, the structure is simplified.

Further, in this embodiment, the snowman-shaped hole 66 is adopted as a retaining means while the temperature sensor 25 is formed into a cylindrical shape. According to this structure, the temperature sensor 25 is retained by radially moving the temperature sensor 25 and locking the rear surface of the temperature sensor 25 to the peripheral edge part 68A on the front surface of the small-diameter hole 68 while the lead wire 26 is inserted through the small-diameter hole 68 after the temperature sensor 25 is inserted through the large-diameter hole 67 in the snowman-shaped hole 66. The temperature sensor 25 can be accommodated in the retained state even after the mounting of the retainer 60 and an assembling operation including the assembling of the temperature sensor 25 can be easily performed.

The present invention is not limited to the above described and illustrated embodiment. For example, the following embodiments are also included in the technical scope of the present invention.

The assembling procedure of the sub-assembly 75 is not limited to the one illustrated in the above embodiment. For example, the temperature sensor 25 may be inserted into the sensor accommodating portion 56 of the inner housing 50 in a state where the temperature sensor 25 is inserted through the snowman-shaped hole 66 of the retainer 60, whereas the vehicle-side terminals 11 connected to the ends of the respective wires 20P, 20S may be inserted into the rear terminal accommodating chambers 53 of the inner housing 50 and, thereafter, the retainer 60 may be fitted and assembled from the rear surface side of the inner housing 50.

Although the sub-assembly 75 is assembled with the outer housing 31 after the outer housing 31 is fixed to the body in advance in the above embodiment, the male housing 30 may be formed by assembling the sub-assembly 75 with the outer housing 31 before the outer housing 31 is fixed to the body and, then, this male housing 30 may be fixed to the body. Also in this case, the vehicle-side terminals 11 are aligned and mounted into the sub-assembly 75 and can be inserted into the front terminal accommodating chambers 40 of the outer housing 31 as the sub-assembly 75 is fitted. Thus, the inserting operation of the vehicle-side terminals 11 can be smoothly and precisely performed as compared with the case where the vehicle-side terminals are directly inserted into the male housing. Consequently, the operation of assembling the vehicle-side connector 10 and mounting it on the body can be quickly performed.

The temperature sensor is not limited to the cylindrical one illustrated in the above embodiment and may have a modified cross-section. If the temperature sensor has, for example, a square cross-section, a locking hole provided on the retainer may be formed by connecting square holes having different sizes and the temperature sensor may be retained by being locked to a hole edge on a back side of the smaller square hole after being inserted through the larger square hole.

Further, if the temperature sensor has a rectangular cross-section, a locking hole provided on the retainer may be a rectangular hole and the temperature sensor may be retained by being locked to a hole edge on a rear side of the rectangular hole by being rotated by 90° after being inserted through the rectangular hole.

The present invention can be similarly applied to vehicle-side connectors of a type in which a temperature sensor is not mounted in a male housing.

Further, the present invention is not limitedly applied to the vehicle-side connector provided in the plug-in hybrid vehicle illustrated in the above embodiment and can be similarly applied to vehicle-side connectors provided in electric vehicles.

LIST OF REFERENCE SIGNS

10 . . . vehicle-side connector
11 . . . vehicle-side terminal (terminal fitting)
11P . . . power terminal
11G . . . ground terminal
11S . . . signal terminal
12 . . . terminal connecting portion
13 . . . wire connecting portion
14 . . . flange
20, 20P, 20S . . . wire
25 . . . temperature sensor
26 . . . lead wire (wire)
30 . . . male housing
31 . . . outer housing
37 . . . terminal accommodating portion
40, 40P, 40S, 40S . . . front terminal accommodating chamber
44 . . . fitting tube portion
47 . . . lock protrusion (lock mechanism portion)
50 . . . inner housing
53, 53P, 53G, 53S . . . rear terminal accommodating chamber
56 . . . sensor accommodating chamber
60 . . . retainer
62, 62P, 62G, 62S . . . vertical groove
63 . . . locking groove body
6 . . . snowman-shaped hole (hole: sensor locking portion)
67 . . . large-diameter hole
70 . . . small-diameter hole
W . . . lock frame (lock mechanism portion)

The invention claimed is:

1. A vehicle-side connector to be connected to a battery mounted in a vehicle, comprising:
    an outer housing to be fixed to a body of the vehicle,
    an inner housing to be fitted into the outer housing from a vehicle interior side,
    terminal fittings respectively connected to a plurality of wires drawn out from the interior of the vehicle including the battery;
    a plurality of terminal accommodating chambers provided from the inner housing to the outer housing and configured such that the respective terminal fittings are inserted and accommodated thereinto from behind;
    a retainer assemblable with the inner housing to lock and retain each terminal fitting;

a lock mechanism portion configured to lock the retainer and the outer housing in a joined state; and a temperature sensor provided on an end of a wire drawn out from the interior of the vehicle, the temperature sensor being formed into a column shape having a larger diameter than the wire wherein the inner housing includes a sensor accommodating chamber configured to accommodate the temperature sensor, and the retainer includes a sensor locking portion configured to lock and retain the temperature sensor, the sensor locking portion being a hole formed by connecting a large-diameter hole having a larger diameter than the temperature sensor and a small-diameter hole having a smaller diameter than the temperature sensor and enabling the wire to be inserted therethrough.

* * * * *